(12) United States Patent
Montesanti et al.

(10) Patent No.: US 8,393,066 B2
(45) Date of Patent: Mar. 12, 2013

(54) METHOD AND SYSTEM FOR ASSEMBLING MINIATURIZED DEVICES

(75) Inventors: Richard C. Montesanti, Pleasanton, CA (US); Jeffrey L. Klingmann, Livermore, CA (US); Richard M. Seugling, Discovery Bay, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 532 days.

(21) Appl. No.: 12/709,321

(22) Filed: Feb. 19, 2010

(65) Prior Publication Data

US 2010/0212133 A1 Aug. 26, 2010

Related U.S. Application Data

(60) Provisional application No. 61/155,800, filed on Feb. 26, 2009.

(51) Int. Cl.
*B23Q 17/00* (2006.01)
(52) U.S. Cl. .................. 29/407.04; 29/407.09; 29/407.1; 29/281.1; 29/906; 269/903; 269/55
(58) Field of Classification Search .............. 29/281.1, 29/906, 407.09, 407.1, 407.04, 897.351; 269/903, 21, 60.55, 60, 55
See application file for complete search history.

(56) References Cited

U.S. PATENT DOCUMENTS

| | | | | |
|---|---|---|---|---|
| 4,887,341 A * | 12/1989 | Sakimori et al. | ........... | 29/888.01 |
| 5,206,984 A * | 5/1993 | Matumoto et al. | ............. | 29/705 |
| 5,515,599 A * | 5/1996 | Best | ............................. | 29/705 |
| 5,768,768 A * | 6/1998 | Best | ............................. | 29/792 |
| 5,771,553 A * | 6/1998 | Sim et al. | ................... | 29/407.09 |
| 5,777,886 A * | 7/1998 | Glucksman et al. | ......... | 716/136 |
| 5,786,759 A * | 7/1998 | Ling | ............................. | 340/542 |
| 6,163,946 A * | 12/2000 | Pryor | ........................ | 29/407.04 |
| 6,317,953 B1 * | 11/2001 | Pryor | ........................ | 29/407.04 |
| 6,481,083 B1 * | 11/2002 | Lawson et al. | ............. | 29/407.04 |
| 6,640,423 B1 * | 11/2003 | Johnson et al. | ................ | 29/740 |
| 6,732,424 B2 * | 5/2004 | Nadicksbernd | ................ | 29/722 |
| 6,886,231 B2 * | 5/2005 | Lawson et al. | ............. | 29/407.01 |
| 6,899,377 B2 * | 5/2005 | Ghuman et al. | ............. | 296/181.1 |
| 7,178,227 B2 * | 2/2007 | Ghuman et al. | ................ | 29/799 |
| 7,185,410 B2 * | 3/2007 | Lawson et al. | ............. | 29/407.01 |
| 7,340,815 B2 * | 3/2008 | Pellerin et al. | ............. | 29/407.04 |
| 7,600,306 B2 * | 10/2009 | Lawson et al. | ............. | 29/407.09 |

(Continued)

OTHER PUBLICATIONS

Castro, "Reconfigurable Assembly Station for Precision Manufacture of Nuclear Fusion Ignition Targets," Presented at: ASPE 24th Annual Meeting, Monterey, CA, United States, Oct. 4-9, 2009; retrieved from the Internet: <https://e-reports-ext.llnl.gov/pdf/376795.pdf>, 6 pages total.

(Continued)

*Primary Examiner* — Joshua J Michener
*Assistant Examiner* — Chi Q Nguyen

(57) ABSTRACT

An apparatus for assembling a miniaturized device includes a manipulator system including six manipulators operable to position and orient components of the miniaturized device with submicron precision and micron-level accuracy. The manipulator system includes a first plurality of motorized axes, a second plurality of manual axes, and force and torque and sensors. Each of the six manipulators includes at least one translation stage, at least one rotation stage, tooling attached to the at least one translation stage or the at least one rotation stage, and an attachment mechanism disposed at a distal end of the tooling and operable to attach at least a portion of the miniaturized device to the tooling. The apparatus also includes an optical coordinate-measuring machine (OCMM) including a machine-vision system, a laser-based distance-measuring probe, and a touch probe. The apparatus also includes an operator control system coupled to the manipulator system and the OCMM.

27 Claims, 5 Drawing Sheets

U.S. PATENT DOCUMENTS 7,721,418 B2 * 5/2010 Mondrusov et al. ............ 29/714

OTHER PUBLICATIONS

Montesanti, "A Precision Robotic Assembly Machine for Building Nuclear Fusion Ignition Targets," FY09 Engineering Research and Technology Report, Oct./Nov. 2009, pp. 14-17; retrieved from the Internet: <https://www-eng.llnl.gov/pdfs/pre_eng_robotic.pdf>.

Montesanti et al., "Robotic System for Precision Assembly of NIF Ignition Targets," Presented at: American Society for Precision Engineering 23rd Annual Meeting, Portland, OR, United States, Oct. 19-24, 2008; retrieved from the Internet: <https://e-reports-ext.llnl.gov/pdf/364891.pdf>.

Montesanti et al., "Initial Testing of a Robotic System for Precision Assembly of NIF Ignition Targets," presented in 18th Annual Target Fabrication Meeting, May 14, 2010; retrieved from the Internet: <http://web.mit.edu/rcmonte/www/presentations/Final_assembly_machine/Montesanti_Target_Fab_2008_FAM_VGs_compressed.pdf>.

* cited by examiner

METHOD AND SYSTEM FOR ASSEMBLING MINIATURIZED DEVICES

CROSS-REFERENCES TO RELATED APPLICATIONS

This application claims priority to U.S. Provisional Patent Application No. 61/155,800, filed on Feb. 26, 2009, entitled "Target Assembly Machine: Precision Robotic System for Assembling Nuclear Fusion Ignition Targets," the disclosure of which is hereby incorporated by reference in its entirety for all purposes.

STATEMENT AS TO RIGHTS TO INVENTIONS MADE UNDER FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND OF THE INVENTION

One of the Grand Challenges in science and engineering is the demonstration of inertial confinement fusion (ICF)—thermonuclear ignition and net energy gain—in the laboratory. Lawrence Livermore National Laboratory (LLNL), in collaboration with its partners in the National Ignition Campaign (NIC)—Los Alamos and Sandia National Laboratories, the Laboratory for Laser Energetics at the University of Rochester and General Atomics of San Diego are tackling this challenge with a credible attempt at ignition on the National Ignition Facility (NIF). NIC is the "bridge" that will take NIF to routine operations as a highly flexible high energy density science facility by 2013.

The experiments at the NIF use a target that is precisely located in the center of the NIF target chamber. Just a few millimeters long, NIF targets are complicated, precision assemblies, often requiring novel material structures. Creating these targets is a complex interplay among target designers, materials scientists and precision engineers. The NIC team is perfecting ICF experiment target fabrication and materials, as well as advancing laser driver performance, target design, and the performance of experimental diagnostics.

Manufacturing requirements for the NIF targets are extremely rigid, including components that are machined to an accuracy of within one micron. Precise microassembly of the targets involves assembly with micron-level accuracy. The extreme temperatures and pressures the targets encounter during experiments make the results highly susceptible to any imperfections in fabrication.

To achieve ignition, the target design contains four components: deuterium and tritium (D-T) fuel, a capsule with fill tube, a hohlraum, and thermal control hardware. A hohlraum is the metal case that surrounds a fuel capsule for NIF experiments. NIF's powerful laser beams impinge on the inside of a hohlraum, where the laser energy is converted to X-ray energy. These X-rays bathe the fuel capsule and rapidly ablate, or burn away, the capsule's outer layer. The principle of conservation of momentum (every action requires an equal and opposite reaction) forces the remaining material to implode or compress. Compression of the D-T fuel—which has been formed in an ice layer inside the capsule—to extraordinarily high temperature, pressure and density ignites a burning hydrogen plasma. To assure the symmetry of the implosion, the capsule is placed within a number of microns of the center of the hohlraum, which is itself just one centimeter across.

Once assembly is complete, the target is integrated with the cryogenic target positioning system (CTS) in NIF. This system forms and characterizes the D-T layer and places the target at target chamber center for the shot. Target position is maintained to within several microns, and temperature is typically held in the range of 18 to 20 Kelvin (−427 to −424 degrees Fahrenheit) with a stability of about one thousandth of a Kelvin.

Current objectives for the NIC include the fabrication of one target per day while maintaining the flexibility to accommodate changes in target parameters resulting from knowledge gained during the campaign. Historically, building ICF targets depended on a significant amount of hand-craft and skill. Using that method, building an ignition target typically required a one-week effort by a team of two to three people and resulted in inconsistent quality.

Therefore, there is a need in the art for improved methods and systems related to assembly of fusion targets and other miniaturized devices.

SUMMARY OF THE INVENTION

The present invention relates generally to assembly machines. More specifically, the present invention relates to methods and systems for assembling miniaturized devices such as nuclear fusion ignition targets. Merely by way of example, the invention has been applied to an assembly system including multiple stages having translational and/or rotational degrees of freedom and force and torque feedback in combination with optical systems. In a particular embodiment, six stage stacks are provided as appropriate for assembly of a nuclear fusion ignition target. The methods and systems can be applied to a variety of other complex miniaturized devices and assemblies.

Embodiments of the present invention provide precise and repeatable motions suitable for target assembly, force and torque feedback appropriate for deterministically mating the tight-fitting and delicate components of the target, and real-time dimensional metrology for precisely aligning the components and obtaining an immediate verification of the accuracy of the completed target. The components of the assembly system are reconfigurable to accommodate changes in target design and provide system flexibility. Utilizing embodiments of the present invention, the target fabrication time has been reduced significantly in comparison to conventional assembly methods.

As described more fully throughout the present specification, the assembly systems described herein are suitable for manufacturing the small and complex laser targets that are fielded on the world's largest and most energetic laser, the NIF. The assembly system includes a reconfigurable manipulator system that provides for robotic assembly of millimeter-scale target components with sub-micron precision and micron-level accuracy in an operating arena the size of a sugar cube. During the assembly process, tactile feedback is provided by force and torque sensors embedded in the manipulator system, and visual feedback and dimensional measurements are provided by an integrated optical coordinate measuring machine (OCMM). The OCMM allows stitching together multiple operating arenas spanning tens of centimeters with micron-level accuracy. An operator provides top-level control of the assembly system and drives it like a surgical robot: initiating and controlling the movement of the motorized instruments that manipulate the target components. Other embodiments of the present invention provide for automation of the target assembly process by adding a machine-based top-level control system, thereby enabling the manufacture of multiple targets per day.

The assembly machine described herein is applicable to other precision manufacturing activities involving assembly and/or disassembly (with submicron precision) of optical/electrical/mechanical/biological systems including millimeter-scale components. Embodiments of the present invention are particularly useful when the components are delicate and may contact each other during the manufacturing process.

According to an embodiment of the present invention, an apparatus for assembling a miniaturized device is provided. The apparatus includes a manipulator system including six manipulators. The manipulator system includes a first plurality of motorized axes and a second plurality of manual axes. The six manipulators are operable to position the miniaturized device with submicron precision and micron-level accuracy. Each of the six manipulators includes at least one translation stage operable to provide at least one translational degree of freedom, at least one rotation stage operable to provide at least one rotational degree of freedom, tooling attached to the at least one translation stage or the at least one rotation stage, and an attachment mechanism disposed at a distal end of the tooling and operable to attach at least a portion of the miniaturized device to the tooling. The apparatus also includes an optical coordinate-measuring machine (OCMM) including a machine-vision system including auxiliary mirrors operable to provide the OCMM with multiple viewing directions of the miniaturized device, edge-detection algorithms to provide distance measurement between at least two features, a laser-based distance-measuring probe, and a touch probe operable to provide micron-level accuracy dimensional measurements of the miniaturized device. The apparatus further includes an operator control system coupled to the manipulator system and the OCMM.

According to another embodiment of the present invention, a system for assembling nuclear fusion ignition targets is provided. The system includes two capsule manipulators each including three motorized translation stages and one manual rotation stage, first tooling, and a first vacuum chuck. The system also includes a diagnostic band manipulator including a two motorized translation stages, one motorized rotation stage, and two manual rotation stages, second tooling, and a second vacuum chuck. The system further includes two TMP manipulators each including three motorized translation stages, an extension arm, force/torque sensors, three manual rotation stages, third tooling, and a third vacuum chuck. The system additionally includes a target base manipulator including three motorized translation stages, one motorized rotation stage, and fourth tooling. Moreover, the system includes an optical coordinate-measuring machine (OCMM) including a machine-vision system including auxiliary mirrors operable to provide the OCMM with multiple viewing directions of the nuclear fusion ignition targets, edge-detection algorithms to provide distance measurement between at least two features, a laser-based distance-measuring probe, and a touch probe operable to provide micron-level accuracy dimensional measurements of the nuclear fusion ignition targets. Additionally, the system includes an operator control system coupled to the two capsule manipulators, the diagnostic band manipulator, the two TMP manipulators, the target base manipulator, and the OCMM.

Numerous benefits are achieved by way of the present invention over conventional techniques. For example, embodiments of the present invention provide for motorized manipulation of millimeter-scale components with 100-nanometer precision and micrometer accuracy. Manipulation of five components is performed in a 1 $cc^3$ operating arena, and within a 15 cm×30 cm×15 cm work volume. Embodiments of the present invention provide for concurrent or simultaneous control of six different component-manipulators, force and torque feedback with 100-milligram and gram-millimeter resolution, and real-time dimensional metrology with micrometer accuracy. Additionally, embodiments utilize a reconfigurable manipulator system that is able to accommodate different target designs and programmable motion control for the manipulator and metrology systems. The system described herein is extendable to automated manufacture of fusion ignition targets and other complex miniature machines. These and other embodiments of the invention along with many of its advantages and features are described in more detail in conjunction with the text below and attached figures.

DETAILED DESCRIPTION OF THE INVENTION

Embodiments of the present invention relate to a high precision robotic assembly machine suitable for manipulating millimeter-scale components with 100-nm precision in an operating arena the size of a sugar cube and within a work volume the size of a shoe box. Innovative use of visual and force/torque feedback allows an operator to drive the machine like a surgical robot, initiating and controlling the movement of the motorized instruments that manipulate the target components, and enabling automation of the assembly process. In one implementation, embodiments of the present invention are used to manufacture extraordinarily demanding nuclear fusion (laser ICF) targets for the NIC. Other embodiments are useful for assembling other complex miniature machines and devices. Embodiments of the present invention provide unprecedented accuracy and efficiency, with a ten-fold reduction in the manpower used to assemble laser fusion targets while improving target quality.

The NIC goal of achieving nuclear fusion burn and gain with the NIF laser utilizes targets that are extraordinarily demanding in materials fabrication, machining, and assembly. The target is designed so that the physics package (gold hohlraum inner-liner, fuel-filled capsule, and the gas between them) can be tailored independently of the thermal-mechanical package (TMP) that holds it (the TMP-halves, diagnostic band, and cooling arms). Many of the target components are designed to slip-fit together with micrometer-clearances, and the dimensional accuracy of a fully assembled target is in the range of 2-20 µm. Historically, building laser fusion targets depended on a significant amount of hand-crafting skill and technique involving microscopes and manually driven fixtures. The embodiments of the present invention described herein, also referred to as the Precision Robotic Assembly Machine, provide novel methods and systems for fusion target assembly, with a ten-fold reduction in manpower needed to assemble a target and improved target quality. As described more fully throughout the present specification, the manipulator system provides precise and repeatable motions, the force and torque feedback allows deterministically mating delicate components, and the real-time dimensional metrology allows for precise alignment of components as well as immediate verification of the as-built accuracy.

Figure 1:
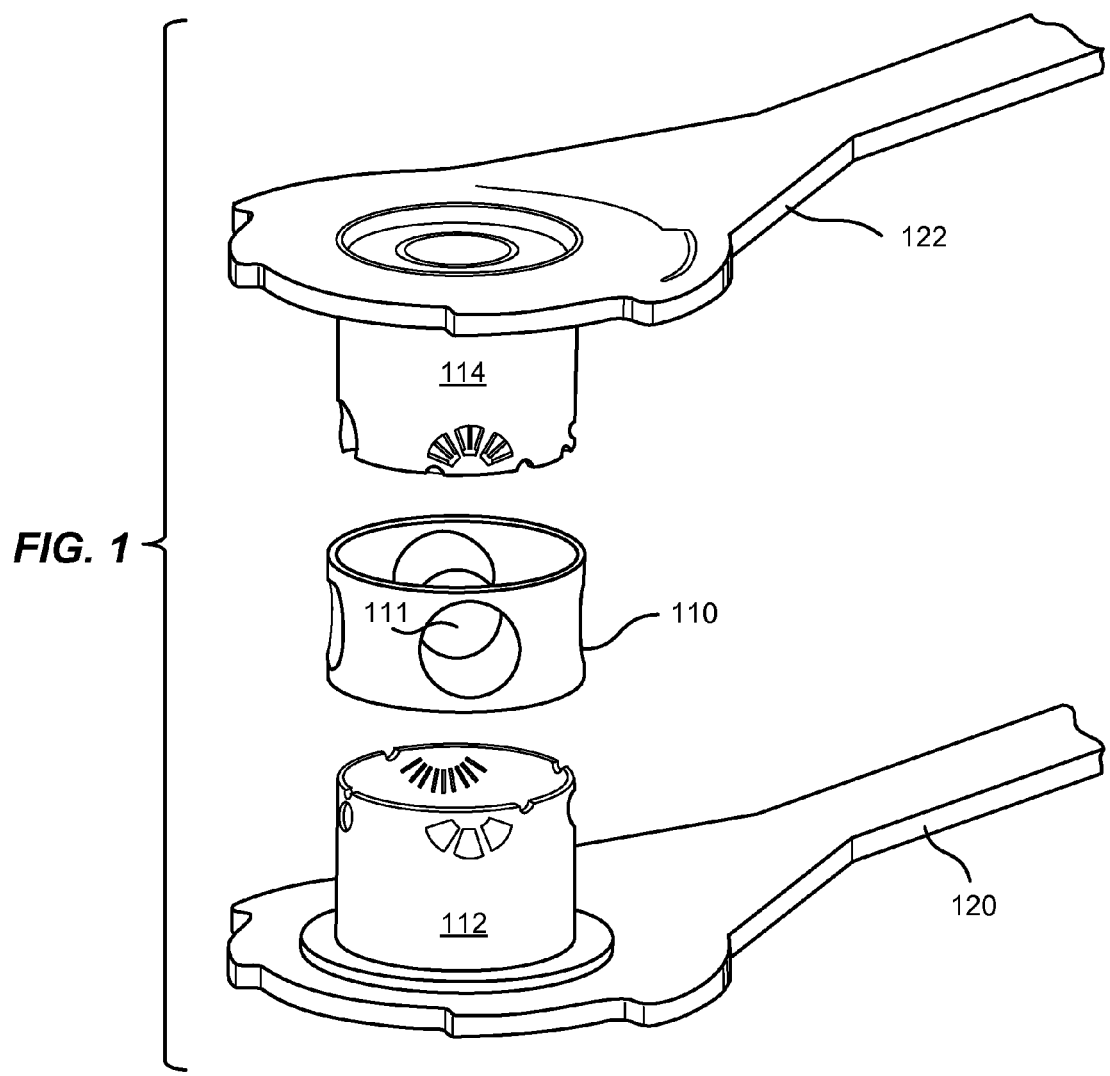
FIG. 1 is a simplified illustration of a nuclear fusion ignition target according to an embodiment of the present invention.

The Precision Robotic Assembly Machine is applicable to the manufacturing of the small and complex laser-driven fusion ignition targets as illustrated in FIG. 1. Although laser fusion targets are a first application to which embodiments of the present invention have been applied, the present invention is not limited to this particular application and can be adapted to build other complex miniature machines. At the heart of the Precision Robotic Assembly Machine is an LLNL-developed reconfigurable manipulator system that assembles millimeter-scale components with 100-nanometer precision and micrometer accuracy. It can manipulate five components in a 1 $cc^3$ operating arena, and has a 15 cm×30 cm×15 cm work volume. Sensors embedded in the manipulator system provide feedback of the contact forces and torques developed between components being assembled with micrometer-level or no clearance. An integrated optical coordinate measuring machine provides high-resolution visual feedback and real-time dimensional metrology with micrometer-level accuracy. An operator provides top-level control of the Precision Robotic Assembly Machine and drives it like a surgical robot; initiating and controlling the movement of the motorized instruments with hand movements that are precise in the millimeter-scale world being scaled to precision in the 100-nanometer world. In other embodiments, a machine-based top-level control system is added to allow automation of the assembly process.

FIG. 1 is a simplified illustration of a nuclear fusion ignition target according to an embodiment of the present invention. The nuclear fusion ignition target includes a diagnostic band 110 in which a fuel-filled capsule 111 is inserted. The gold hohlraum (not shown) is contained in the two TMP halves 112 and 114, which are held together by the diagnostic band 110. Two cooling arms 120 and 122 are joined to the hohlraum via the TMP halves as illustrated in FIG. 1. Each TMP half 112/114 and each cooling arm 120/122 form a TMP sub-assembly, resulting in a lower TMP sub-assembly including TMP half 112 and cooling arm 120 and an upper TMP sub-assembly including TMP half 114 and cooling arm 122. The cooling arms are mounted to the target base in a later fabrication stage.

The Precision Robotic Assembly Machine operates in a class 1000 clean room, and includes an LLNL-developed manipulator system integrated with an optical coordinate-measuring machine with a working volume of 61 cm×66 cm×30 cm.

Figure 2:
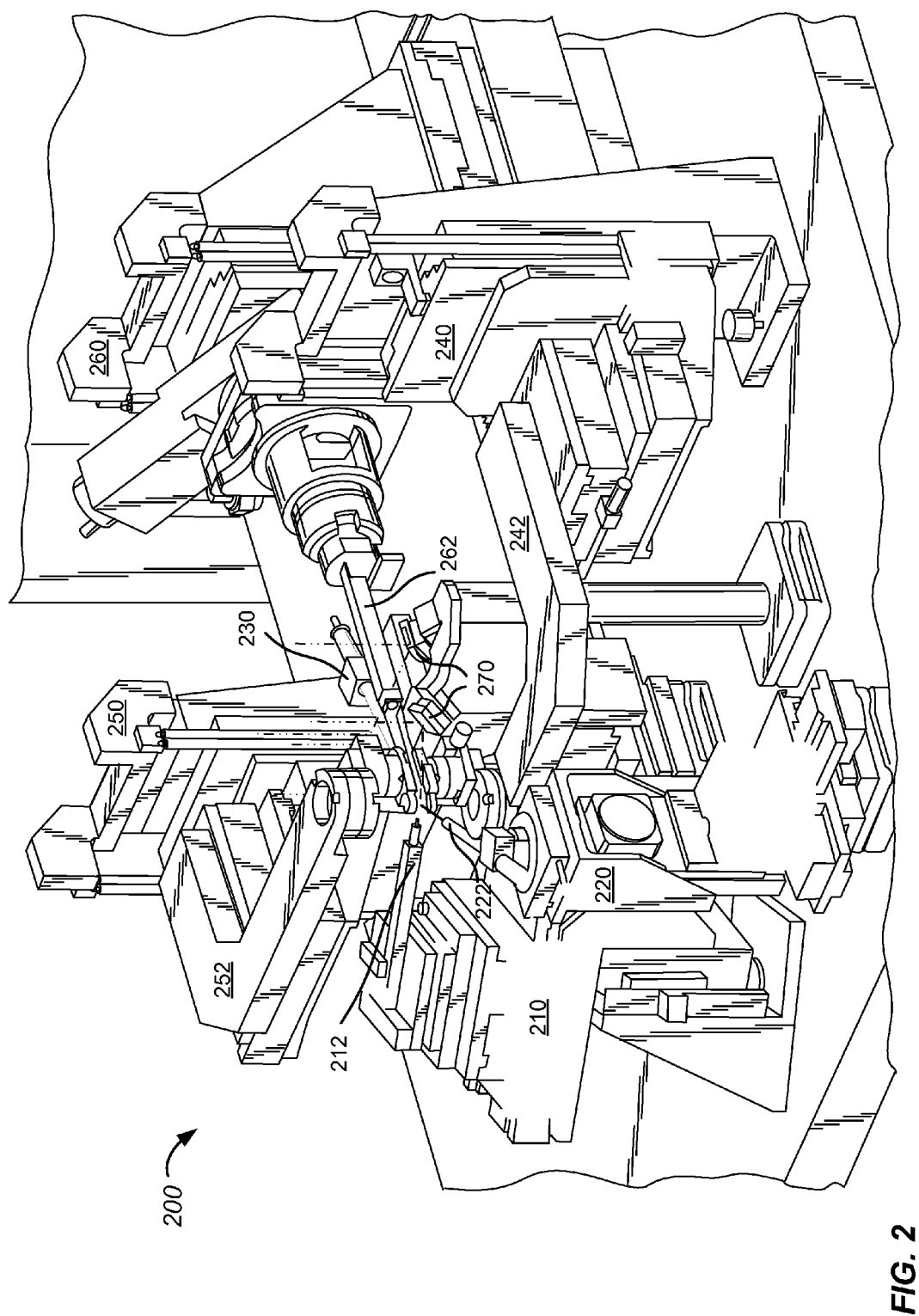
FIG. 2 is a simplified illustration of a miniaturized device assembly machine according to an embodiment of the present invention.

FIG. 2 is a simplified illustration of a miniaturized device assembly machine according to an embodiment of the present invention. This miniaturized device assembly machine is also referred to as a manipulator system 200. Referring to FIG. 2, the manipulator system 200 including six manipulators. In the embodiment illustrated in FIG. 2, the manipulator system includes a first plurality of motorized axes and a second plurality of manual axes. The six manipulators are operable to position the miniaturized device with submicron precision and micron-level accuracy. Each of the six manipulators includes an x-y-x stage operable to provide three translational degrees of freedom or an x-y stage operable to provide two translational degrees of freedom, tooling attached to the x-y-z stage or x-y stage, and an attachment mechanism disposed at a distal end of the tooling and operable to attach at least a portion of the miniaturized device to the tooling. Some of the manipulators include one to three rotation stages used to provide rotational degrees of freedom of the tooling.

As illustrated in FIG. 2, a first manipulator is the diagnostic band manipulator 210. The diagnostic band manipulator 210 is adapted to support the diagnostic band 110 in a predetermined position at a predetermined orientation. Two translation stages are used to provide for x-y motion of the diagnostic band, and three rotation stages are used to provide for rotational motion of the diagnostic band. An attachment mechanism in the form of a vacuum wand 212 is provided as part of the diagnostic band manipulator 210. The vacuum wand, under control of a vacuum controller, is able to support the diagnostic band during positioning operations. In an embodiment, the two translation stages and one rotation stage are motorized and operated under computer control although this is not required by the present invention. In some embodiments, linear motor-driven crossed-roller bearing slides are utilized for one or more of the actuated degrees of freedom because their compactness allows for their integration into tightly packed stage stacks. Additionally, these stages provide for repeatable motion and positioning resolution suitable for assembly operations.

Commercial linear motor-driven crossed-roller bearing slides were selected for the majority of the actuated degrees of freedom because their compactness allowed integrating them into tightly packed stage stacks, and their repeatable motion and positioning resolution met our requirements.

A second manipulator is the first capsule stage 220 and a third manipulator is the second capsule stage 230. These capsule stages are utilized to support and position the capsule during the assembly operations. The first capsule stage 220 includes three translation stages that are used to provide for x-y-z motion of the capsule as it is inserted into the diagnostic band, and one rotation stage used to provide for adjusting the orientation of the capsule. An attachment mechanism in the form of a vacuum wand 222 is provided as part of the first capsule stage 220. The second capsule stage also has an attachment mechanism in the form of a vacuum wand (not shown). During operation according to one embodiment, the first capsule stage 220 supports the capsule during initial assembly, handing the capsule off to the second capsule stage 230 after partial assembly of the hohlraum. In other embodiments, operation uses stage stacks similar to second capsule stage 230, which are configured to manipulate other target components, for example, the end of the capsule fill tube.

As shown in FIG. 2, a positioning stage for the lower TMP sub-assembly is provided as a fourth manipulator 240. A three-axis stage provides for x-y-z motion of extension arm 242, on which a tilt/roll/yaw stage is mounted. Additional description related to the tilt/roll/yaw stage is provided in relation to FIG. 3. The tilt/roll/yaw stage has tooling mounted thereon adapted to support and position the lower TMP sub-assembly. Additionally, an attachment mechanism 312 (e.g., a vacuum chuck) is connected to or integrated as part of the tooling.

An additional positioning stage for the upper TMP sub-assembly is provided as a fifth manipulator 250. A three-axis stage provides for x-y-z motion of extension arm 252, on which a tilt/roll/yaw stage is mounted. Additional description related to the tilt/roll/yaw stage is provided in relation to FIG. 3. The tilt/roll/yaw stage has tooling mounted thereon adapted to support and position the upper TMP sub-assembly. Additionally, an attachment mechanism (e.g., a vacuum chuck) is connected to or integrated as part of the tooling. The fourth and fifth manipulator are utilized to support and position the TMP sub-assemblies as they are mated to the top and bottom of the diagnostic band. Force and torque sensors are integrated into the tooling and are discussed in more detail below.

A sixth manipulator 260 is provided to support and position the target base 262, which is joined to the cooling arms during the fabrication process. The sixth manipulator 260 includes a three-axis stage used in positioning the target base, and a one-axis rotation stage used in orienting the target base, during assembly, and an attachment mechanism (e.g., a kinematic mount) to support the target base. In one embodiment, a kinematic mount allows remove-and-replace mounting of an object with precise repeatability of the object's location and orientation. Typically, the x-y-z stages and some of the rotation stages for all the manipulators are motorized and operated under computer control although this is not required by the present invention. Additional rotational stages may be combined with the x-y-z stages to provide additional degrees of freedom. One of ordinary skill in the art would recognize many variations, modifications, and alternatives.

Using the five manipulators 210, 220, 230, 240, and 250, the diagnostic band 110, capsule, lower TMP half 112, upper TMP half 114, lower cooling arm 120, and upper cooling arm 122 are supported and positioned during assembly operations. Subsequently, the assembled target is supported and attached to the target base using one or more of the five manipulators and the sixth manipulator 260. In another embodiment, the sixth manipulator 260 is used to support and position the capsule and diagnostic band 110 during assembly operations, and the third manipulator 230 is used to support and position the capsule fill tube (not shown) during assembly operations.

As described more fully below, the optical coordinate-measuring machine (OCMM) includes a machine-vision system, laser-based distance-measuring probe, and touch-probe that provide micrometer-accuracy dimensional measurements of the target during assembly. Auxiliary mirrors 270 provide the OCMM or an operator with multiple viewing directions of the target and/or other system components. The vision system of the OCMM is used to guide the initial approach and alignment of the target components, and to measure the relative position and orientation of the components. Force and torque feedback is used to guide the final approach, alignment, and mating of delicate target components that fit together with micrometer level or no clearance.

The manipulator system can be reconfigured to accommodate different laser fusion target designs. In an embodiment, the six manipulators employ 19 motorized axes and 10 manual axes to support and position the target components with 100-nanometer precision and micrometer accuracy. Although the embodiment of the manipulator system illustrated in FIG. 2 is suitable for assembling five components (six if one counts the end of the capsule fill tube), other embodiments are suitable for assembling more components or less components depending on the particular assembly operation being performed. One of ordinary skill in the art would recognize many variations, modifications, and alternatives.

Each manipulator provides a target component with the translational and rotational degrees of freedom needed to assembly the target. In the embodiment illustrated in FIG. 2, the target components are held by a vacuum chuck at the distal end of the tooling that attaches that component to its manipulator. Incorporated in the proximal ends of the tooling are kinematic or semi-kinematic mounts that provide accurate remove-and-replace orientation of the tooling. One of the more significant challenges during the design phase for the manipulator system was maintaining a relatively open operating arena while providing the total of twenty-nine degrees of freedom for the five components being assembled. Kinematic mounts allow accurate removal and replacement of the auxiliary mirrors that provide the OCMM with multiple viewing directions into the assembly arena, and of the capsule manipulators that occupy the same region as some of those mirrors and/or the target base at different times during the assembly process. Additional remove-and-replace systems provided by other embodiments include a long working-distance binocular microscope with an integral video camera, and a steady-rest that assists the hand-application of an epoxy that holds the target together in some assembly processes.

Figure 3:
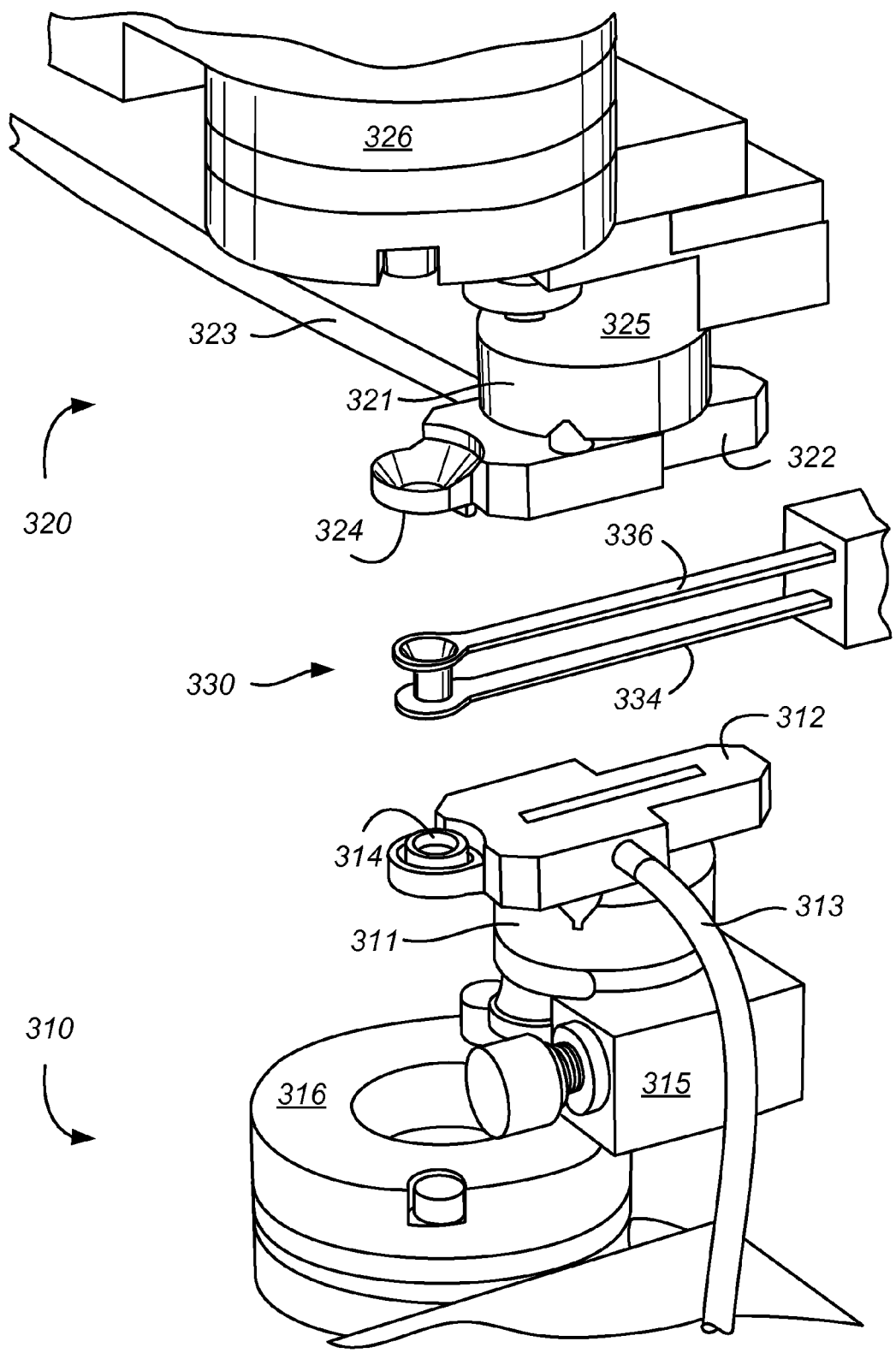
FIG. 3 is a simplified illustration of components of the miniaturized assembly device of FIG. 2 and a nuclear fusion ignition target during assembly according to an embodiment of the present invention.

FIG. 3 is a simplified illustration of components of the miniaturized assembly device of FIG. 2 and a nuclear fusion ignition target during assembly according to an embodiment of the present invention. A portion 310 of the fourth manipulator 240 (the positioning stage for the lower TMP sub-assembly) and a portion 320 of the fifth manipulator 250 (the positioning stage for the upper TMP sub-assembly) are illustrated in FIG. 3. The assembled target 330 is also illustrated.

The attachment mechanism 312 is attached to vacuum line 313 to provide for vacuum that is applied to the bottom of cooling arm 334. A fitting 314 is formed on the end of the attachment mechanism 312 and is adapted to fit into the bottom of the cooling arm 334. A kinematic mount 311 joins the attachment mechanism 312 to a tilt/roll/yaw stage 315 that supports the attachment mechanism 312 and provides for three additional degrees of freedom in addition to the x-y-z motion provided by the x-y-z stages. In the embodiment illustrated in FIG. 3, the tilt/roll/yaw stage 315 is manually adjustable although they can be motorized in some embodiments. Force/torque sensors 316 support the tilt/roll/yaw stage 315 and are attached to the extension arm 242, which in turn, is attached to the x-y-z stages of the fourth manipulator. In some embodiments, benefits are provided by mounting the force/torque sensors 316 between the tilt/roll/yaw stage 315 and the attachment mechanism 312. As the components are aligned and fitted together, the force/torque sensors 316 embedded in the manipulator system provide 100-miligram resolution force and gram-millimeter resolution torque feedback of the contact loads.

For portion 320 of the fifth manipulator 250 (the positioning stage for the upper TMP sub-assembly) the attachment mechanism 322 is attached to vacuum line 323 to provide for vacuum that is applied to the top of cooling arm 336. A fitting 324 is formed on the end of the attachment mechanism 322 and is adapted to fit into the top of the cooling arm 336. A kinematic mount 321 joins the attachment mechanism 322 to a tilt/roll/yaw stage 325 that supports the attachment mechanism 322 and provides for three additional degrees of freedom in addition to the x-y-z motion provided by the x-y-z stages. In the embodiment illustrated in FIG. 3, the tilt/roll/yaw stage 325 is manually adjustable although they can be motorized in some embodiments. Force/torque sensors 326 support the tilt/roll/yaw stage 325 and are attached to the extension arm 252, which in turn, is attached to the x-y-z stages of the fifth manipulator. It should be noted that the force and torque feedback provided by embodiments of the present invention provide the system with a level of control that can be critical when assembling a complex miniature machine made up of delicate components that contact each other with high tolerances.

A unique attribute of the system described herein is the ability to stitch together multiple millimeter-scale operating arenas over distances spanning tens of centimeters. In each of the operating arenas, multiple components can be manipulated with 100-nanometer precision and 100-milligram resolution force feedback. Additionally, embodiments of the present invention provide an enabling platform for significant advances in the discovery and manufacture of centimeter-scale systems that integrate millimeter- and micrometer-scale optical, electrical, mechanical, and biological subsystems.

Figure 4:
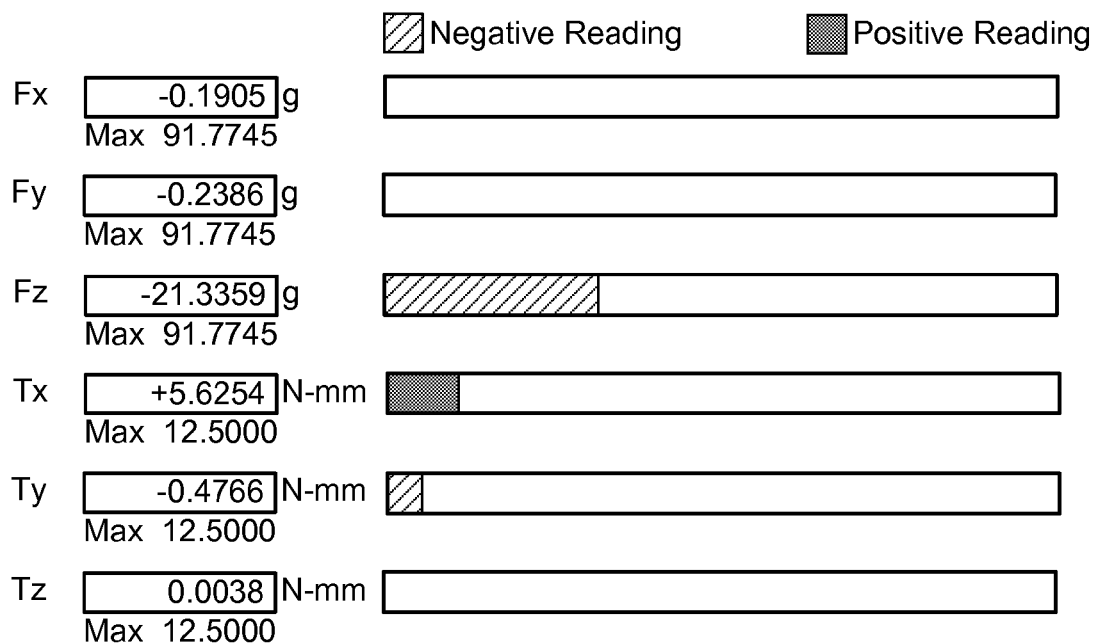
FIG. 4 is a simplified illustration of force and torque feedback displays according to an embodiment of the present invention.

FIG. 4 is a simplified illustration of force and torque feedback displays according to an embodiment of the present invention. The force and torque feedback displays provide the operator with information about whether or not the components are joining as desired or if the operator should, using the motorized manipulators, adjust the positions of the components in order to fit them together without crushing the fragile components. Utilizing the force and torque feedback, the operator is able to use millimeter scale hand movements to control the assembly process with micron-level precision. Additionally, the force and torque feedback provides the operator with a sense of feel down to (and below in some embodiments) the 100 mg force level and the 1 mm-mg torque level. In some embodiments, linear torque and force measurement graphics are utilized, whereas in other embodiments, non-linear torque and force measurement graphics are utilized, for example, logarithmic scales. Although the graphics illustrated in FIG. 4 are oriented along a line, circular graphics similar to a speedometer can be utilized as well.

In some embodiments, the force and torque feedback displays are replaced with a haptic feedback system, for example, a joystick that enables the operator to feel pressure as the components start to bind up and a reduction in pressure as the components fit together after position and angle adjustments are made by the operator. In other embodiments, audio indicators are added to the visual indicators to provide additional feedback to the system operator. In another embodiment, these functions are automated by a robotic control system.

Figure 5:
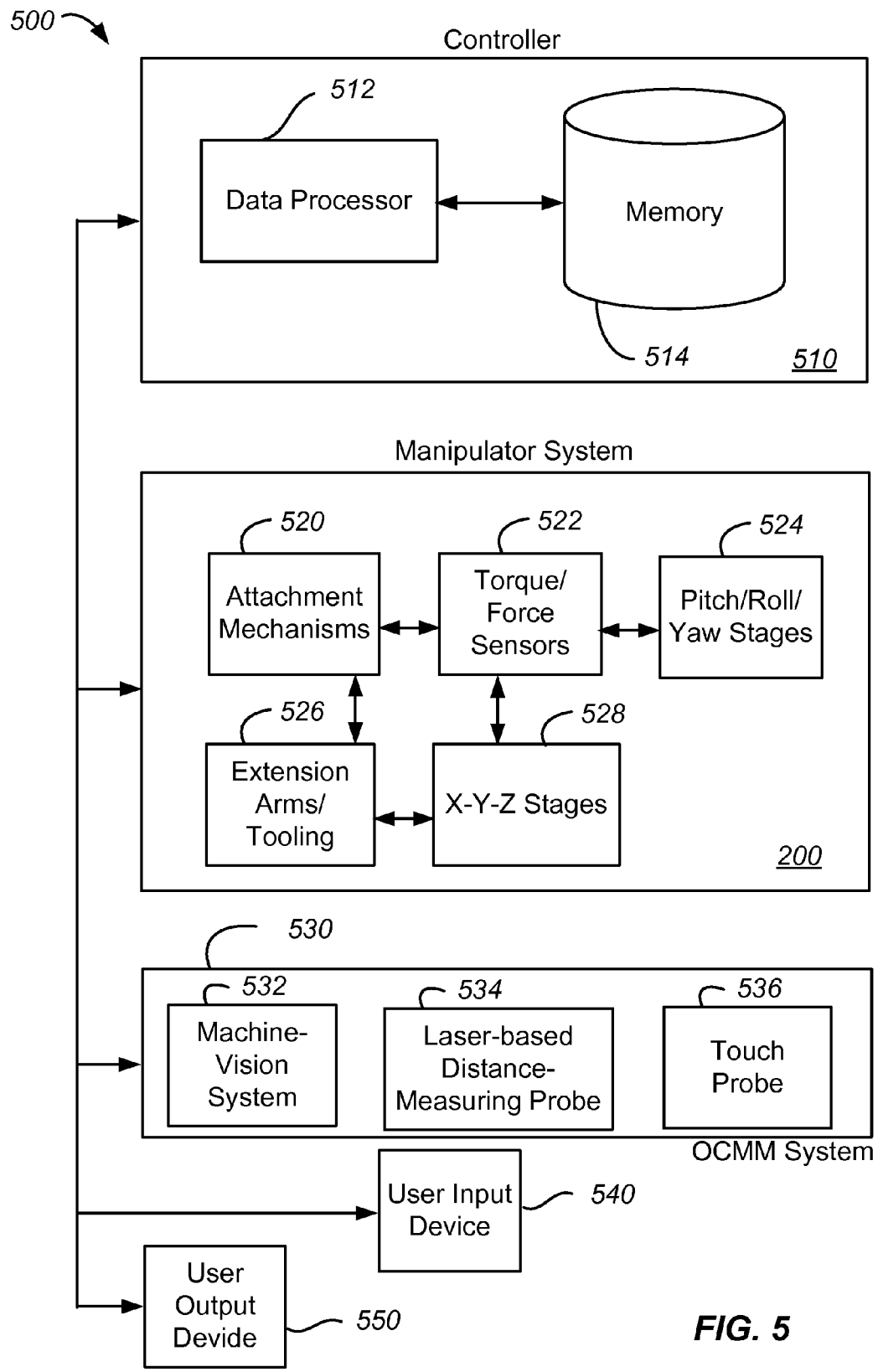
FIG. 5 is a simplified schematic diagram of a miniaturized device assembly system according to an embodiment of the present invention.

FIG. 5 is a simplified schematic diagram of an assembly system according to an embodiment of the present invention. The assembly system 500 includes a manipulator system 200, an OCMM 530, a controller 510, one or more user input devices 540, and one or more user output devices 550. Typically, the assembly system 500 is operated in a class 1000 clean room. The controller, also referred to as part of an operator control system, includes a data processor 512 (also referred to as a processor) and a memory 514. The controller 510 is coupled to and interacts with the one or more user input devices 540, the one or more user output devices 550, the manipulator system 200, and the OCMM system 530 during assembly operations.

The data processor 512 can be a general purpose microprocessor configured to execute instructions and data, such as a Pentium processor manufactured by the Intel Corporation of Santa Clara, Calif. It can also be an Application Specific Integrated Circuit (ASIC) that embodies at least part of the instructions for performing the method in accordance with the present invention in software, firmware and/or hardware. As an example, such processors include dedicated circuitry, ASICs, combinatorial logic, other programmable processors, combinations thereof, and the like. The memory 514 (also referred to as a database or a computer readable medium) can be local or distributed as appropriate to the particular application. The memory can store information related to operation of the assembly system, program code and instructions executed by the data processor 512, and other suitable data.

Memory 514 may include a number of memories including a main random access memory (RAM) for storage of instructions and data during program execution and a read only memory (ROM) in which fixed instructions are stored. Thus, memory 514 provides persistent (non-volatile) storage for program and data files, and may include a hard disk drive, flash memory, a floppy disk drive along with associated removable media, a Compact Disk Read Only Memory (CD-ROM) drive, an optical drive, removable media cartridges, and other like storage media.

The user input devices 540 and the user output devices 550 can be referred to as an I/O module. The user input devices 540, which may include one or more user operated controls, joysticks, hand wheels, or the like, receive inputs from users and or control systems in order to provide inputs for the various manipulators, vacuum chucks, optical elements, and the like, either directly from the input device or through the controller. Different user input devices can be utilized to operate various components of the assembly system or may be multi-function input devices as appropriate to the particular application. The user output devices 550, which may include one or more display screens, joysticks, tactile feedback devices, or the like, provide feedback to the user and/or other control systems, either directly from the various manipulators or through the controller. As an example, the force and torque feedback information discussed in relation to FIG. 4 can be displayed on one of the user output devices. The user output devices may provide information to the operator in one or more forms, including visual, audio, or other suitable formats. Typically, the user will interact with the assembly system using one or more graphical user interfaces (GUIs). Using the GUIs, the system receives input from the user through the user input devices 540 and displays output to the user through the user output devices 550 as appropriate to the particular application.

The OCMM includes a machine-vision system 532 having auxiliary mirrors operable to provide the OCMM with multiple viewing directions of the miniaturized device, a laser-based distance-measuring probe 534, and a touch probe 536 operable to provide micron-level accuracy dimensional measurements of the miniaturized device. The OCMM provides the functionality of a real time dimensional metrology system. As an example, the machine-vision system of the OCMM can focus on a first object with edge-detection algorithms in its controller and identify the position of the first object. Subsequently, the OCMM can focus on a second object separated from the first object by a distance of up to 66 cm and identify the position of the second object with precise resolution. As an example, accuracy of 3 µm over a distance of 30 cm are provided by an embodiment of the present invention. This ability to register widely separated locations with high accuracy is useful in target assembly operations since the registration between the target and the target base is tightly controlled. In other implementations, other particular distances and accuracies are provided as appropriate to the particular application.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An apparatus for assembling a miniaturized device, the apparatus comprising:
a manipulator system including six manipulators, the manipulator system comprising a first plurality of motorized axes and a second plurality of manual axes, wherein the six manipulators are operable to position and orient components of the miniaturized device with submicron precision and micron-level accuracy, each of the six manipulators comprising:
at least one translation stage operable to provide at least one translational degree of freedom;
at least one rotation stage operable to provide at least one rotational degree of freedom;
tooling attached to the at least one translation stage or the at least one rotation stage; and
an attachment mechanism disposed at a distal end of the tooling and operable to attach at least a portion of the miniaturized device to the tooling;
an optical coordinate-measuring machine (OCMM) comprising:
a machine-vision system;
a laser-based distance-measuring probe; and
a touch probe operable to provide micron-level accuracy dimensional measurements of the miniaturized device; and
an operator control system coupled to the manipulator system and the OCMM, wherein two of the six manipulators further comprise force/torque sensors mechanically coupled to the tooling and operable to provide force resolution at levels less than 10 grams and torque resolution at levels less than 500 gram-millimeters.

2. The apparatus of claim 1 wherein the miniaturized device comprises a nuclear fusion ignition target.

3. The apparatus of claim 2 wherein the manipulator system is reconfigurable to accommodate different designs for the nuclear fusion ignition target.

4. The apparatus of claim 2 wherein the six manipulators comprise two thermo-mechanical package manipulators, a diagnostic band manipulator, two capsule manipulators, and a target base manipulator.

5. The apparatus of claim 1 wherein the first plurality of motorized axes comprises 19 motorized axes.

6. The apparatus of claim 1 wherein the second plurality of manual axes comprises 10 motorized axes.

7. The apparatus of claim 1 wherein the attachment mechanism comprises a vacuum chuck.

8. The apparatus of claim 1 wherein the third plurality of sensors are operable to provide force resolution at levels less than 1 gram and torque resolution at levels less than 50 gram-millimeters.

9. The apparatus of claim 8 wherein the third plurality of sensors are operable to provide force resolution at levels less than 0.1 gram and torque resolution at levels less than 5 gram-millimeters.

10. The apparatus of claim 1 wherein two of the six manipulators further comprise a tilt/roll/yaw stage operable to provide three rotational degrees of freedom.

11. The apparatus of claim 1 wherein at least one of the touch probe, the machine-vision system, or the laser-based distance-measuring probe is further operable to provide micron-level accuracy dimensional measurements of a base for the miniaturized device, wherein the base is separated from the miniaturized device by greater than 10 cm.

12. The apparatus of claim 1 wherein the machine-vision system is operable to utilize edge-detection algorithms to provide distance measurement between at least two features.

13. The apparatus of claim 1 wherein the machine vision system includes auxiliary mirrors operable to provide the OCMM with multiple viewing directions of the miniaturized device.

14. A system for assembling nuclear fusion ignition targets, the system comprising:
two capsule manipulators each including three motorized translation stages and one manual rotation stage, first tooling, and a first vacuum chuck;
a diagnostic band manipulator including a two motorized translation stages, one motorized rotation stage, and two manual rotation stages, second tooling, and a second vacuum chuck;
two thermal-mechanical package (TMP) manipulators each including three motorized translation stages, an extension arm, force/torque sensors, three manual rotation stages, third tooling, and a third vacuum chuck;
a target base manipulator including three motorized translation stages, one motorized rotation stage, and fourth tooling;
an optical coordinate-measuring machine (OCMM) comprising:
a machine-vision system including auxiliary mirrors operable to provide the OCMM with multiple viewing directions of the nuclear fusion ignition targets;
a laser-based distance-measuring probe; and
a touch probe operable to provide micron-level accuracy dimensional measurements of the nuclear fusion ignition targets; and
an operator control system coupled to the two capsule manipulators, the diagnostic band manipulator, the two TMP manipulators, the target base manipulator, and the OCMM.

15. The system of claim 14 wherein the first vacuum chuck comprises a vacuum wand.

16. The system of claim 14 wherein the force/torque sensors are positioned between the extension arm and the three manual rotation stages.

17. The system of claim 14 wherein the force/torque sensors are positioned between the three manual rotation stages and the third tooling.

18. The system of claim 14 wherein the third tooling includes a kinematic coupling.

19. The system of claim 14 wherein the fourth tooling includes a kinematic coupling.

20. The system of claim 14 wherein the three manual rotation stages of the two TMP manipulators comprise pitch/roll/yaw stages.

21. The system of claim 14 wherein the operator control system comprises a controller, one or more user input devices, and one or more user output devices.

22. The system of claim 21 wherein the one or more user output devices comprise a plurality of linear torque and force measurement graphics.

23. The system of claim 22 wherein force/torque sensors are operable to provide force resolution at levels less than 10 grams and torque resolution at levels less than 500 gram-millimeters.

24. The system of claim 23 wherein force/torque sensors are operable to provide force resolution at levels less than 1 grams and torque resolution at levels less than 50 gram-millimeters.

25. The system of claim 24 wherein force/torque sensors are operable to provide force resolution at levels less than 0.1 gram and torque resolution at levels less than 5 gram-millimeters.

26. The system of claim 14 wherein each of the nuclear fusion ignition targets include a capsule, a capsule fill-tube, a hohlraum, a diagnostic band, a lower TMP half, and an upper TMP half.

27. The apparatus of claim 14 wherein the machine-vision system is operable to utilize edge-detection algorithms to provide distance measurement between at least two features.

* * * * *